(12) United States Patent
Ishizu (10) Patent No.: US 10,771,732 B2
(45) Date of Patent: Sep. 8, 2020

(54) SYSTEM, IMAGING APPARATUS, INFORMATION PROCESSING APPARATUS, AND RECORDING MEDIUM

(71) Applicant: CANON KABUSHIKI KAISHA, Tokyo (JP)

(72) Inventor: Satoshi Ishizu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 27 days.

(21) Appl. No.: 16/108,354

(22) Filed: Aug. 22, 2018

(65) Prior Publication Data
US 2019/0075270 A1 Mar. 7, 2019

(30) Foreign Application Priority Data
Sep. 1, 2017 (JP) ................. 2017-168432

(51) Int. Cl.
| | | |
|---|---|---|
| *H04N 5/765* | (2006.01) | |
| *H04N 5/238* | (2006.01) | |
| *H04B 7/26* | (2006.01) | |
| *H04N 5/232* | (2006.01) | |
| *H04N 5/77* | (2006.01) | |

(52) U.S. Cl.
CPC ............. *H04N 5/765* (2013.01); *H04B 7/26* (2013.01); *H04N 5/238* (2013.01); *H04N 5/23206* (2013.01); *H04N 5/23293* (2013.01); *H04N 5/232941* (2018.08); *H04N 5/77* (2013.01)

(58) Field of Classification Search
CPC .... H04N 5/765; H04N 5/238; H04N 5/23206; H04N 5/77; H04N 5/23293; H04N 5/232941; H04B 7/26

USPC ...................................... 348/333.01
See application file for complete search history.

(56) References Cited

U.S. PATENT DOCUMENTS

| | | | | |
|---|---|---|---|---|
| 9,992,470 | B1* | 6/2018 | Hofmann | H04N 5/772 |
| 10,592,089 | B1* | 3/2020 | Hofmann | G06F 3/0482 |
| 10,630,894 | B2* | 4/2020 | Torikai | H04N 5/23222 |
| 2016/0295107 | A1* | 10/2016 | Kinoshita | G03B 17/18 |
| 2016/0330366 | A1* | 11/2016 | Kinoshita | H04N 5/23222 |
| 2017/0104921 | A1* | 4/2017 | Yoshida | H04N 5/23241 |

(Continued)

FOREIGN PATENT DOCUMENTS

JP    2004-054820 A    2/2004

*Primary Examiner* — Pritham D Prabhakher
(74) *Attorney, Agent, or Firm* — Cowan, Liebowitz & Latman, P.C.

(57) ABSTRACT

In a system according to the present invention, the imaging apparatus includes: a detection unit configured to detect a state which is regarded as a notification target among a plurality of states that the imaging apparatus can take; a control unit configured to perform control so that a mark corresponding to the state detected by the detection unit is displayed on a display unit; and a transmission unit configured to transmit identification information corresponding to the state, which is regarded as the notification target, in response to the detection of the state by the detection unit, and the information processing apparatus includes: a reception unit configured to receive the identification information transmitted by the transmission unit; and a notification unit configured to performs notification of notification information on the state corresponding to the identification information received by the reception unit by a method different from displaying.

20 Claims, 9 Drawing Sheets

(56) References Cited

U.S. PATENT DOCUMENTS

| | | | | |
|---|---|---|---|---|
| 2017/0195577 A1* | 7/2017 | Mitani | ............... | H04N 5/23203 |
| 2017/0208244 A1* | 7/2017 | Ahn | ..................... | H04N 5/2628 |
| 2017/0221379 A1* | 8/2017 | Onda | ....................... | H04N 5/77 |
| 2017/0351373 A1* | 12/2017 | Ueno | ............... | H04N 5/232939 |
| 2017/0353655 A1* | 12/2017 | Torikai | ................... | G08B 21/18 |
| 2017/0359506 A1* | 12/2017 | Manzari | ........... | H04N 5/232125 |
| 2019/0028637 A1* | 1/2019 | Kolesov | ................... | G06T 7/73 |

\* cited by examiner

| NOTIFICATION IDENTIFIER | DEVICE MODEL NUMBER | INSTRUCTION DATA | DESCRIPTION DATA |
|---|---|---|---|
| 1 | eos5d-mk4 | PLEASE IMAGE CAPTURE IN MANUAL FOCUS MODE. | THIS MESSAGE IS DISPLAYED BECAUSE FOCUSING IS NOT ACHIEVED IN CASE OF SCENE WHERE THERE IS LITTLE DIFFERENCE BETWEEN SUBJECT AND BACKGROUND. |
| 2 | eos5d-mk4 | PLEASE IMAGE CAPTURE BY INCREASING F-VALUE. | THIS MESSAGE IS DISPLAYED BECAUSE FOCUSING IS NOT ACHIEVED IN NIGHT SCENE WITH LITTLE LIGHT. |
| 3 | eos5d-mk4 | PICTURE STYLE IS SET TO MONOCHROME. PLEASE GO AHEAD WITH THIS SETTING UNLESS THERE IS A PROBLEM. | THIS MESSAGE IS DISPLAYED TO CONFIRM WHETHER THIS SETTING IS INTENDED STATE WHEN PICTURE STYLE IS SET TO MONOCHROME. |
| 4 | eos5d-mk4 | WHITE BALANCE CORRECTION IS SET. PLEASE GO AHEAD WITH THIS SETTING UNLESS THERE IS A PROBLEM. | THIS MESSAGE IS DISPLAYED TO CONFIRM WHETHER THIS SETTING IS INTENDED STATE WHEN WHITE BALANCE CORRECTION IS SET. |
| 5 | eos5d-mk4 | RECORDING IMAGE QUALITY IS CHANGED. PLEASE GO AHEAD WITH THIS SETTING UNLESS THERE IS A PROBLEM. | THIS MESSAGE IS DISPLAYED TO CONFIRM WHETHER THIS SETTING IS INTENDED STATE WHEN RECORDING IMAGE QUALITY IS CHANGED. |
| 6 | ef24-70L2 | PLEASE MOVE AWAY FROM SUBJECT. | SHORTEST IMAGE CAPTURING DISTANCE IS 0.38 m. |
| 7 | ef70-200LlS2 | PLEASE MOVE AWAY FROM SUBJECT. | SHORTEST IMAGE CAPTURING DISTANCE IS 1.2 m. |

SYSTEM, IMAGING APPARATUS, INFORMATION PROCESSING APPARATUS, AND RECORDING MEDIUM

BACKGROUND OF THE INVENTION

Field of the Invention

The present invention relates to a system, an imaging apparatus, an information processing apparatus, and a recording medium.

Description of the Related Art

Conventionally, a function of displaying a notification mark within a finder of a camera has been provided. For example, the notification mark is displayed when a distance to an object is shorter than a shortest image capturing distance of the camera. Moreover, the notification mark is displayed when a picture style is monochrome, white balance correction is set, and a recording quality is changed. With this function, a user (a photographer) is notified of a fact that it is difficult to image capture pictures and a shutter is not pressed.

Japanese Patent Application Publication No. 2004-54820 discloses a smartphone that acquires a description (description data) corresponding to an operation state of a camera from a server in response to pressing of a help switch of the camera and displaying the description.

SUMMARY OF THE INVENTION

However, since the notification mark displayed within the finder is a general-purpose mark, a user cannot easily understand the details of the notification mark even after viewing the displayed notification mark. Moreover, in order to read the description (a description corresponding to the notification mark) displayed by the technique disclosed in Japanese Patent Application Publication No. 2004-54820, a user needs to take his/her eye off the finder. Furthermore, when the description is to be displayed using the technique disclosed in Japanese Patent Application Publication No. 2004-54820, it is necessary to press the help switch. Therefore, it is not possible to understand the details of the notification mark easily even when the technique disclosed in Japanese Patent Application Publication No. 2004-54820 is used. As a result, the user cannot concentrate on image capturing when the user wants to understand the details of the displayed notification mark.

The present invention provides a technique for allowing a user to easily understand the details of a notification mark displayed within a finder without disturbing image capturing.

The present invention in its first aspect provides a system comprising an imaging apparatus and an information processing apparatus, wherein the imaging apparatus includes:

a detection unit configured to detect a state which is regarded as a notification target among a plurality of states that the imaging apparatus can take;

a control unit configured to perform control so that a mark corresponding to the state detected by the detection unit is displayed on a display unit; and a transmission unit configured to transmit identification information corresponding to the state, which is regarded as the notification target, in response to the detection of the state by the detection unit, and the information processing apparatus includes:

a reception unit configured to receive the identification information transmitted by the transmission unit; and a notification unit configured to performs notification of notification information on the state corresponding to the identification information received by the reception unit by a method different from displaying.

The present invention in its second aspect provides an imaging apparatus comprising:

a detection unit configured to detect a state, which is regarded as a notification target, among a plurality of states that the imaging apparatus can take while an imaging process is being performed;

a control unit configured to perform control so that a mark corresponding to the state detected by the detection unit is displayed on a display unit; and a transmission unit configured to transmit identification information corresponding to the state, which is regarded as the notification target, to an information processing apparatus in response to the detection of the state by the detection unit, wherein notification of notification information on the state corresponding to the identification information is performed by a method different from displaying.

The present invention in its third aspect provides an information processing apparatus comprising:

a reception unit configured to receive, in response to change of the state of the imaging apparatus into the state, which is regarded as the notification target, while an imaging process is being performed, identification information corresponding to the state; and a notification unit configured to performs notification of notification information on the state corresponding to the identification information received by the reception unit by a method different from displaying.

The present invention in its fourth aspect provides a non-transitory computer readable medium that stores a program, wherein the program causes a computer to execute a control method for an imaging apparatus, the method includes:

a detection step of detecting a state, which is regarded as a notification target, among a plurality of states that the imaging apparatus can take while an imaging process is being performed;

a control step of performing control so that a mark corresponding to the state detected in the detection step is displayed on a display unit; and a transmission step of transmitting identification information corresponding to the state, which is regarded as the notification target, to an information processing apparatus in response to the detection of the state in the detection step; and notification of notification information on the state corresponding to the identification information is performed by a method different from displaying.

The present invention in its fifth aspect provides a non-transitory computer readable medium that stores a program, wherein the program causes a computer to execute a control method for an information processing apparatus;

the method includes:

a reception step of receiving, in response to change of the state of the imaging apparatus into the state, which is regarded as the notification target, while an imaging process is being performed, identification information corresponding to the state; and a notification step of performing notification of notification information on the state corresponding to the identification information received in the reception step by a method different from displaying.

According to the present invention, it is possible to allow a user to easily understand the details of a notification mark displayed within a finder without disturbing image capturing.

Further features of the present invention will become apparent from the following description of exemplary embodiments with reference to the attached drawings.

DESCRIPTION OF THE EMBODIMENTS

Hereinafter, a preferred embodiment of the present invention will be described with reference to the drawings. However, the configuration and the process described below are examples only, and the scope of the present invention is not limited thereto.

Figure 1:
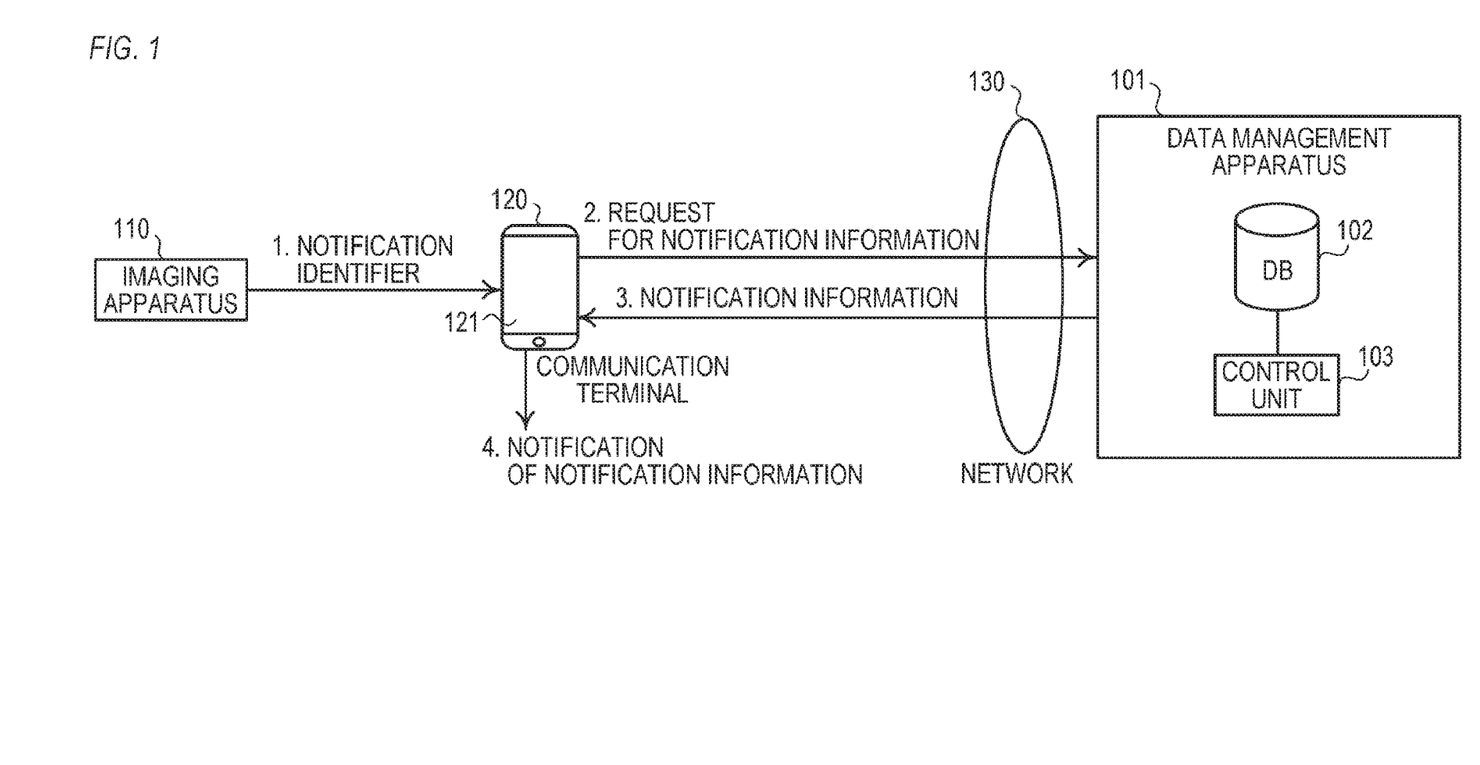
FIG. 1 is a diagram illustrating a schematic configuration example of a system according to the present embodiment.

FIG. 1 is a diagram illustrating a schematic configuration example of a system according to the present embodiment. The system of FIG. 1 includes an imaging apparatus 110, a communication terminal (an information processing apparatus) 120, and a data management apparatus 101. The system may not have the data management apparatus 101.

The imaging apparatus 110 is a mobile terminal such as a camera having an imaging function. The imaging apparatus 110 and the communication terminal 120 are connected so as to be able to communicate with each other using the standards of a wireless LAN such as Wi-Fi. For example, the imaging apparatus 110 displays a notification mark on a display unit visible over an optical finder and transmits identification information created by a description language such as XML to the communication terminal 120. The imaging apparatus 110 may communicate directly with the communication terminal 120 and may communicate with the communication terminal 120 via another apparatus. The display unit on which the notification mark is displayed is not particularly limited. For example, the notification mark may be displayed on a display unit (an LCD or the like) used as an electronic viewfinder. The display unit may be a portion of the imaging apparatus 110 and may be not.

The communication terminal 120 is a portable communication terminal such as a personal computer (PC) or a smartphone. The communication terminal 120 is connected to the data management apparatus 101 via a network 130. In the communication terminal 120, a program 121 having a standard protocol capable of transmitting information via the network 130 can operate. The communication terminal 120 receives identification information transmitted from the imaging apparatus 110 with the aid of the program 121, Subsequently, the communication terminal 120 accesses the data management apparatus 101 using a protocol such as HTTP with the aid of the program 121 and transmits request information created by a description language such as XML to the data management apparatus 101. The communication terminal 120 receives notification information created by a description language such as HTML or XML from the data management apparatus 101. After that, the communication terminal 120 (the program 121 of the communication terminal 120) notifies the user of the notification information received from the data management apparatus 101. The user is notified of the notification information via display or audio. A display unit on which the notification information is different from the display unit on which the notification mark is displayed. The display unit on which the notification information is displayed may be a portion of the communication terminal 120 and may be not.

The data management apparatus 101 has an information database 102 and a control unit 103. Table data indicating the notification information is stored in the information database 102. The control unit 103 controls the entire data management apparatus 101.

Although the details will be described later, the communication terminal 120 acquires the notification information corresponding to (associated with) the identification information transmitted from the imaging apparatus 110 from the data management apparatus 101 and notifies the user of the acquired notification information. Although the details will be described later, in the present embodiment, when the notification information corresponding to the identification information transmitted from the imaging apparatus 110 is already acquired, the communication terminal 120 notifies the user of the notification information without communicating with the data management apparatus 101. Although the details will be described later, the communication terminal 120 can notify the user of the notification information via a vibration pattern set in advance as well as display or voice.

The program 121 of the communication terminal 120 may be a general-purpose program and may be an exclusive-purpose application program. The program 121 may be a browser used for a Web service. The imaging apparatus 110 may be a camera and may be an information processing apparatus such as a PC or a smartphone. The data transmitted via the network 130 is preferably encrypted by SSL or the like.

Figure 2:
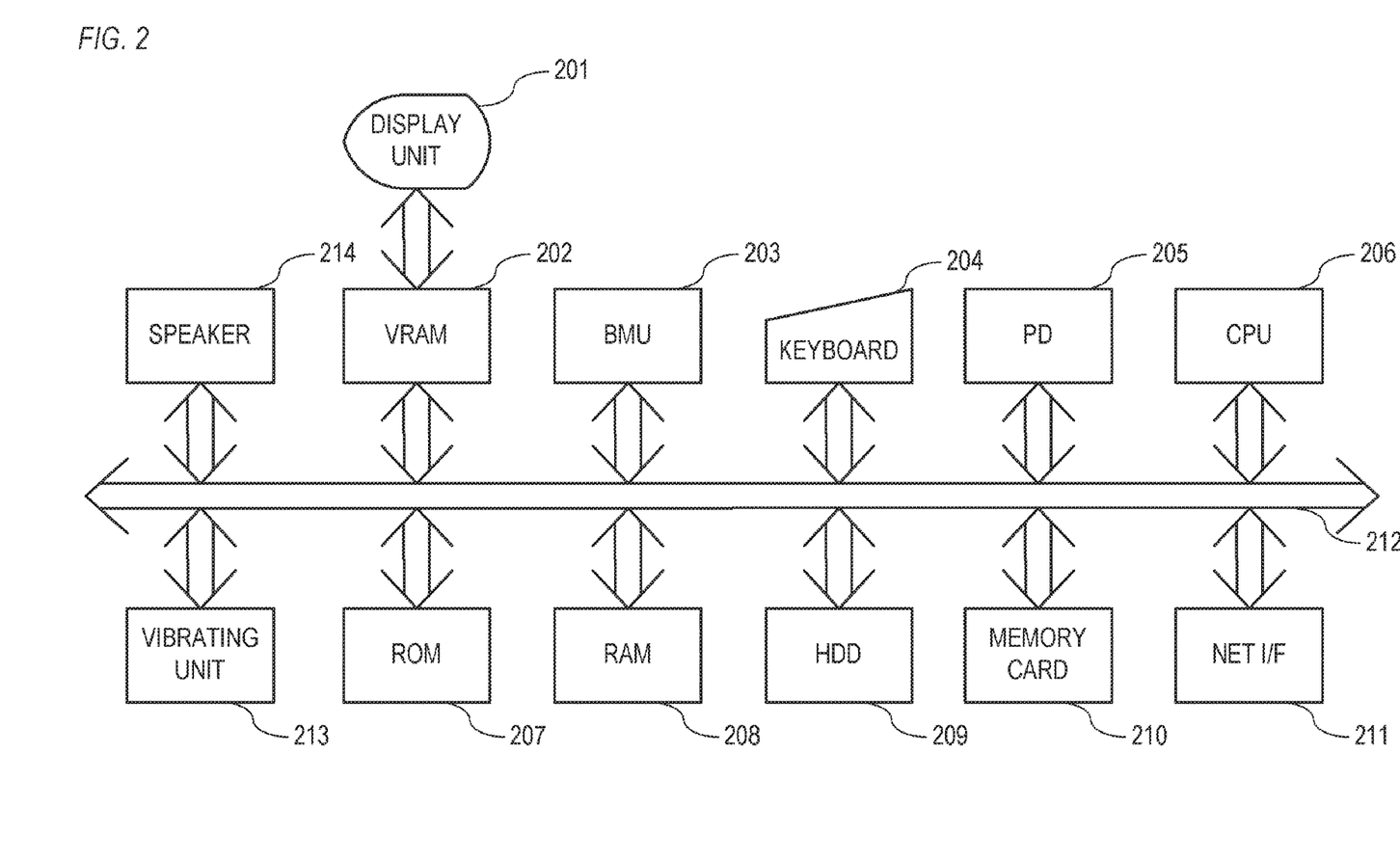
FIG. 2 is a block diagram illustrating a schematic configuration example of a communication terminal according to the present embodiment.

FIG. 2 is a block diagram illustrating a schematic configuration example of the communication terminal 120.

The display unit 201 displays various images (photos, CGs, icons, messages, menus, and the like). The display unit 201 is formed of a liquid crystal display panel or the like, for example. A bitmap image displayed on the display unit 201 is drawn on a VRAM 202. The bitmap images (bitmap image data stored in the VRAM 202) drawn on the VRAM 202 are read into the display unit 201 by a predetermined order, and the read bitmap images are displayed on the display unit 201. The display unit 201 may be an apparatus separated from the communication terminal 120.

A hit move unit (BMU) 203 controls various types of data transmission. For example, the BMU 203 controls data transmission between memories (for example, between the VRAM 202 and another memory) and data transmission between a memory and an I/O device (a network I/F 211 or the like).

A keyboard 204 and a pointing device (PD) 205 are operating members that can receive user's operations on the communication terminal 120. The keyboard 204 has various keys for inputting characters and the like. The PD 205 are used for indicating an icon, a menu, other contents, and the like displayed on the display unit 201 and drag-and-dropping an object, for example. The PD 205 is a mouse, a touch pad, a touch panel, or the like. At least one of the keyboard 204 and the PD 205 may be an operating member separated from the communication terminal 120.

A CPU 206 controls operations of respective constituent units of the communication terminal 120 and operations of external apparatuses of the communication terminal 120 on the basis of an OS and a control program stored in a ROM 207, a HDD 209, or a memory card 210. The ROM 207 stores various control programs and various pieces of data. A RAM 208 is used as a work area of the CPU 206, a saving area of data when processing errors, a load area of a control program, and the like. The HDD 209 and the memory card 210 stores various control programs, various pieces of data stored temporarily, and the like. The control program may be provided from an external apparatus (another information processing apparatus or the like) to the CPU 206 via the network I/F 211.

The network I/F 211 communicates with an external apparatus (another information processing apparatus, a printer, or the like) of the communication terminal 120 via a network. For example, the network I/F 211 is used for communicating with the imaging apparatus 110 and the data management apparatus 101.

A bus 212 includes an address bus, a data bus, and a control bus. The bus 212 is used for transmitting data between the constituent units of the communication terminal 120.

A vibrating unit 213 is formed of a motor or the like and vibrates in various vibration patterns. When the vibrating unit 213 vibrates, the communication terminal 120 also vibrates in the same vibration pattern as the vibration pattern of the vibrating unit 213. A speaker 214 outputs various sounds (audio). The speaker 214 may be an apparatus separated from the communication terminal 120.

Figure 3:
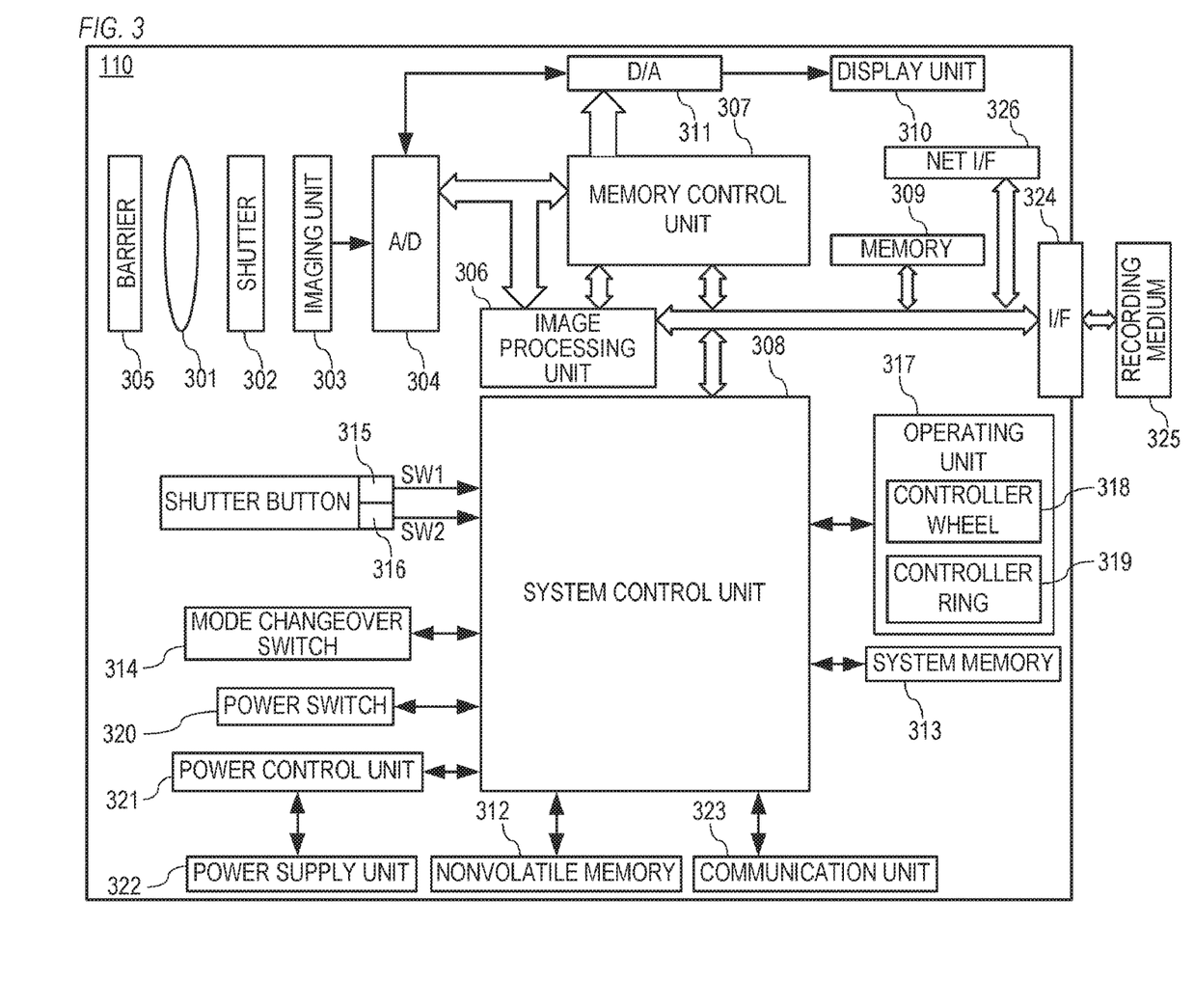
FIG. 3 is a block diagram illustrating a schematic configuration example of an imaging apparatus according to the present embodiment.

FIG. 3 is a block diagram illustrating a schematic configuration example of the imaging apparatus 110.

An image capturing lens 301 includes a zoom lens and a focus lens. A shutter 302 has a diaphragm function. An imaging unit 303 converts light (an optical image) having passed through the image capturing lens 301 and the shutter 302 to an electrical signal and outputs the electrical signal. The imaging unit 303 is formed of a CCD or CMOS element. An A/D converter 304 converts the electrical signal (an analog signal) output from the imaging unit 303 to a digital signal (image data) and outputs the digital signal. The image data output from the A/D converter 304 is written to a memory 309 after passing through an image processing unit 306 and a memory control unit 307 or the memory control unit 307 only. A barrier 305 covers the image capturing lens 301 and the like to prevent contamination or destruction of an imaging system including the image capturing lens 301, the shutter 302, and the imaging unit 303.

The image processing unit 306 performs predetermined image processing (pixel interpolation, resizing (reduction or enlarging), color conversion, and the like) with respect to the image data from the AD converter 304 or the image data from the memory control unit 307. The image processing unit 306 performs predetermined arithmetic processing using the imaged image data. A system control unit 308 performs exposure control and ranging control on the basis of the result of the predetermined arithmetic processing.

The system control unit 308 controls the entire imaging apparatus 110. The system control unit 308 realizes the processing of the imaging apparatus 110 by executing a program stored in a nonvolatile memory 312.

The memory 309 stores the image data generated by the A/D converter 304, the image data to be displayed on the display unit 310. The memory 309 has a storage capacity sufficient for storing a predetermined number of still images and a predetermined length of video and audio. The memory 309 also functions as a memory (video memory) for image display.

A D/A converter 311 converts the display image data stored in the memory 309 to an analog signal and supplies the analog signal to the display unit 310. The display unit 310 displays an image corresponding to the analog signal supplied from the D/A converter 311. In this manner, the display image data written to the memory 309 is supplied to the display unit 310 via the D/A converter 311 and is displayed on the display unit 310.

The display unit 310 displays an image corresponding to the analog signal supplied from the D/A converter 311. The display unit 310 is formed of an LCD or the like, for example. The display unit 310 displays the notification mark and the like.

The nonvolatile memory 312 is a memory capable of erasing and recording data electrically and is an EEPROM or the like, for example. The nonvolatile memory 312 stores constants for operation of the system control unit 308 and programs and the like executed by the system control unit 308.

A system memory 313 is a RAM, for example. Constants and variables for operation of the system control unit 308, programs read from the nonvolatile memory 312, and the like are loaded into the system memory 313.

A mode changeover switch 314, a first shutter switch 315, a second shutter switch 316, and an operating unit 317 are used for inputting various operation instructions to the system control unit 308.

The mode changeover switch 314 switches an operation mode of the system control unit 308 to any one of a plurality of operation modes including a still-image recording mode, a video recording mode, a playback mode, and the like.

The first shutter switch 315 is turned on by so-called half-press (an image capturing preparation instruction) in the course of operating a shutter button provided in the imaging apparatus 110 and generates a first shutter switch signal SW1.

The second shutter switch 316 is turned on by so-called full-press (an image capturing instruction) upon completion of operation of the shutter button and generates a second shutter switch signal SW2. The system control unit 308 starts an operation of a series of image capturing processes from reading of signals from the imaging unit 303 to writing of image data to the recording medium 325 according to the second shutter switch signal SW2.

Various function icons displayed on the display unit 310 are selected and operated, whereby functions are appropriately allocated to respective scenes of respective operating members of the operating unit 317. As a result, the respective operating members function as various function buttons.

Examples of the function buttons include an OK button, an End button, a Return button, an Image Transfer button, a Jump button, a Filter button, an Attribute Change button, and the like. For example, when a menu button is pressed, a menu screen on which various settings can be made is displayed on the display unit 310. A user can perform various settings immediately using the menu screen displayed on the display unit 310, a four-way button, and a SET button.

A controller wheel 318 is a rotatable operating member included in the operating unit 317 and is used for indicating a selection item together with a direction button. For example, when the controller wheel 318 is rotated, an electrical pulse signal corresponding to the rotation amount (an operation amount) is generated. The system control unit 308 controls operations of the respective constituent units of the imaging apparatus 110 on the basis of the pulse signal. Moreover, the system control unit 308 can determine a rotation angle, a rotation speed, and the like of the rotation operation of the controller wheel 318 on the basis of the pulse signal. The controller wheel 318 may be an arbitrary operating member as long as it can detect a rotation operation.

A controller ring 319 is rotatable a member included in the operating unit 317. A rotation operation of the controller ring 319 is an operation of rotating about an optical axis around a lens barrel. For example, when the controller ring 319 is rotated, an electrical pulse signal corresponding to the rotation amount (an operation amount generated. The system control unit 308 controls the operation of the respective constituent units of the imaging apparatus 110 on the basis of the pulse signal. When a function changeover button of the controller ring 319 is pressed, a menu screen on which the function allocated to the controller ring 319 can be changed is displayed on the display unit 310. In general, the controller ring 319 and the controller wheel 318 are used for selecting and changing a mode item.

A power switch 320 switches the power of the imaging apparatus 110 on and off A power control unit 321 includes a battery detection circuit, a DC-DC converter, a switch circuit for switching a block to be energized, and the like. The power control unit 321 detects attachment/detachment of a battery, a battery type, and a residual battery capacity. Moreover, the power control unit 321 controls a DC-DC converter on the basis of the detection result and an instruction of the system control unit 308 and supplies a necessary voltage to the respective constituent units including a recording medium 325 for a necessary period. A power supply unit 322 includes a primary battery such as an alkaline battery or a lithium battery, a secondary battery such as a NiCd battery, a NiMH battery, or a Li battery, an AC adapter, and the like.

A communication unit 323 transmits an image stored in the recording medium 325 to an external apparatus of the imaging apparatus 110. An interface 324 is an interface to the recording medium 325. The recording medium 325 is formed of a semiconductor memory, a magnetic disk, and the like.

The network I/F 326 is controlled by the system control unit 308 and communicates with the external apparatus of the imaging apparatus 110 via a network. For example, the network I/F 326 is used for communicating with the communication terminal 120. The communication with the communication terminal 120 may be performed by the communication unit 323.

Figure 4:
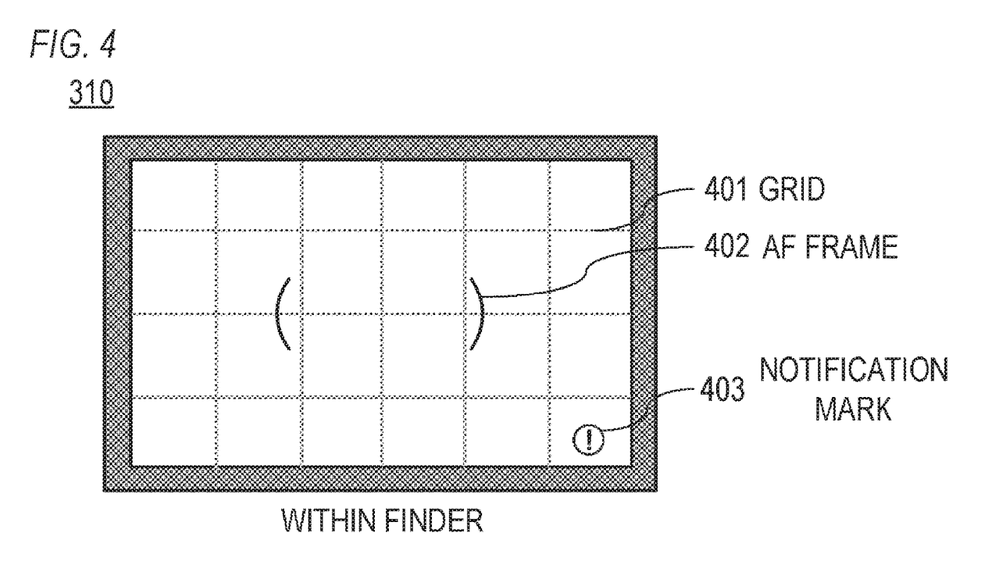
FIG. 4 is a diagram illustrating an example of how a notification mark according to the present embodiment is displayed.

FIG. 4 is a diagram illustrating an example of how a notification mark according to the present embodiment is displayed. A grid 401 is used for confirming a horizontal direction and a vertical direction and determining the composition of an object, and the like. An autofocus frame 402 is used for determining a focus position. A notification mark 403 is displayed when a shutter button is not pressed (i.e. An instruction of shooting is not accepted by the imaging apparatus 110 and the imaging apparatus 110 does not record a shot image into a memory card.) due to a certain reason during image capturing and when a setting state of the imaging apparatus 110 is a specific setting state, for example.

Figure 5:
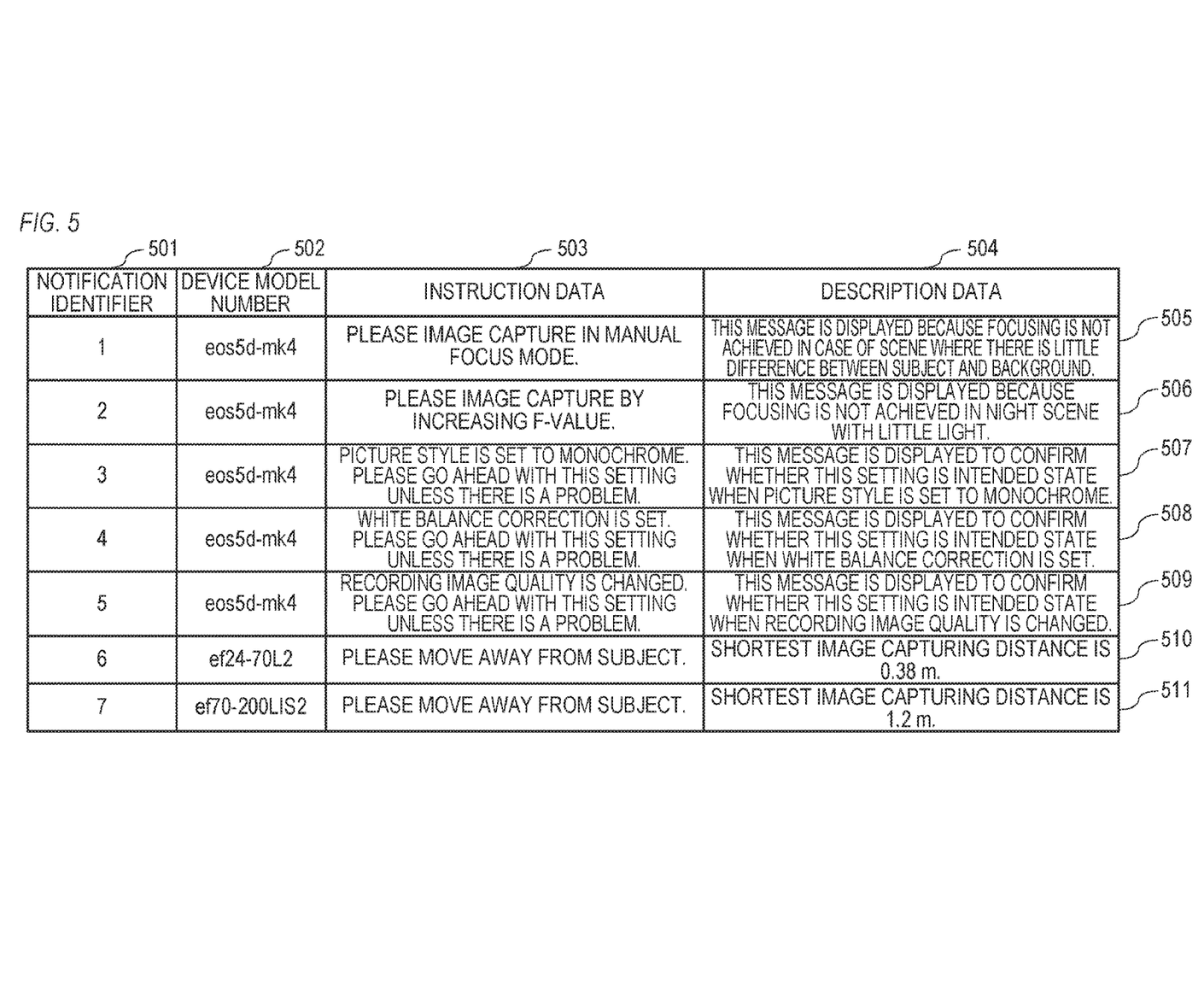
FIG. 5 is a diagram illustrating an example of table data according to the present embodiment.

FIG. 5 illustrates an example of a data structure of table data stored in the information database 102 of the data management apparatus 101. A notification identifier 501 indicates a unique number for identifying notification information and the state of the imaging apparatus 110. A device model number 502 indicates the name of an apparatus corresponding to the notification information. Instruction data 503 and description data 504 are notification information related to the state (the state of the imaging apparatus 110) corresponding to the notification mark. Specifically, the instruction data 503 and the description data 504 are notification information for describing the state corresponding to the notification mark. More specifically, the instruction data 503 is notification information indicating a method for removing (coping with) the state corresponding to the notification mark (that is, a method for removing the display of the notification mark). The description data 504 is notification information indicating the meaning of the state corresponding to the notification mark (that is, the reason why the notification mark is displayed).

Entries 505 to 509 indicate that pieces of notification information (method for removing display of the notification mark and reason why the notification mark is displayed) corresponding to EOS5D-MK4 are stored. An entry 510 indicates that notification information corresponding to the notification identifier 6 and EF24-70L2 (lens) stored. Entry 511 indicates that notification information corresponding to the notification identifier 7 and EF70-200LIS2 (lens) is stored.

A user cannot easily understand the details (method for removing display of the notification mark and reason why the notification mark is displayed) of the notification mark 403 even after viewing the notification mark 403 displayed on the display unit 310. Due to this, conventionally, the user has to waste time in stopping image capturing temporarily and resuming image capturing again. In such a conventional countermeasure, the user may fail to image capture a momentary scene that the user wants to capture.

In contrast, in the present embodiment, when the notification mark is displayed during image capturing, for example, the communication terminal 120 automatically notifies the user of the instruction data 503 (in this case, it is preferable to output an audio from the speaker 214). In this way, the user can easily understand a method for removing the display of the notification mark 403 without stopping image capturing. Moreover, for users who wants to know more detailed information, for example, after image capturing ends, the communication terminal 120 automatically notifies the user of the description data 504 (in this case, it is preferable to display information on the screen of the display unit 201). In this way, the user can easily understand the reason why the notification mark 403 is displayed and an image capturing method that avoids the notification mark 403, for example. The description data 504 may be notified of via an audio or the like and the instruction data 503 may be notified of via screen display or the like.

Figure 6:
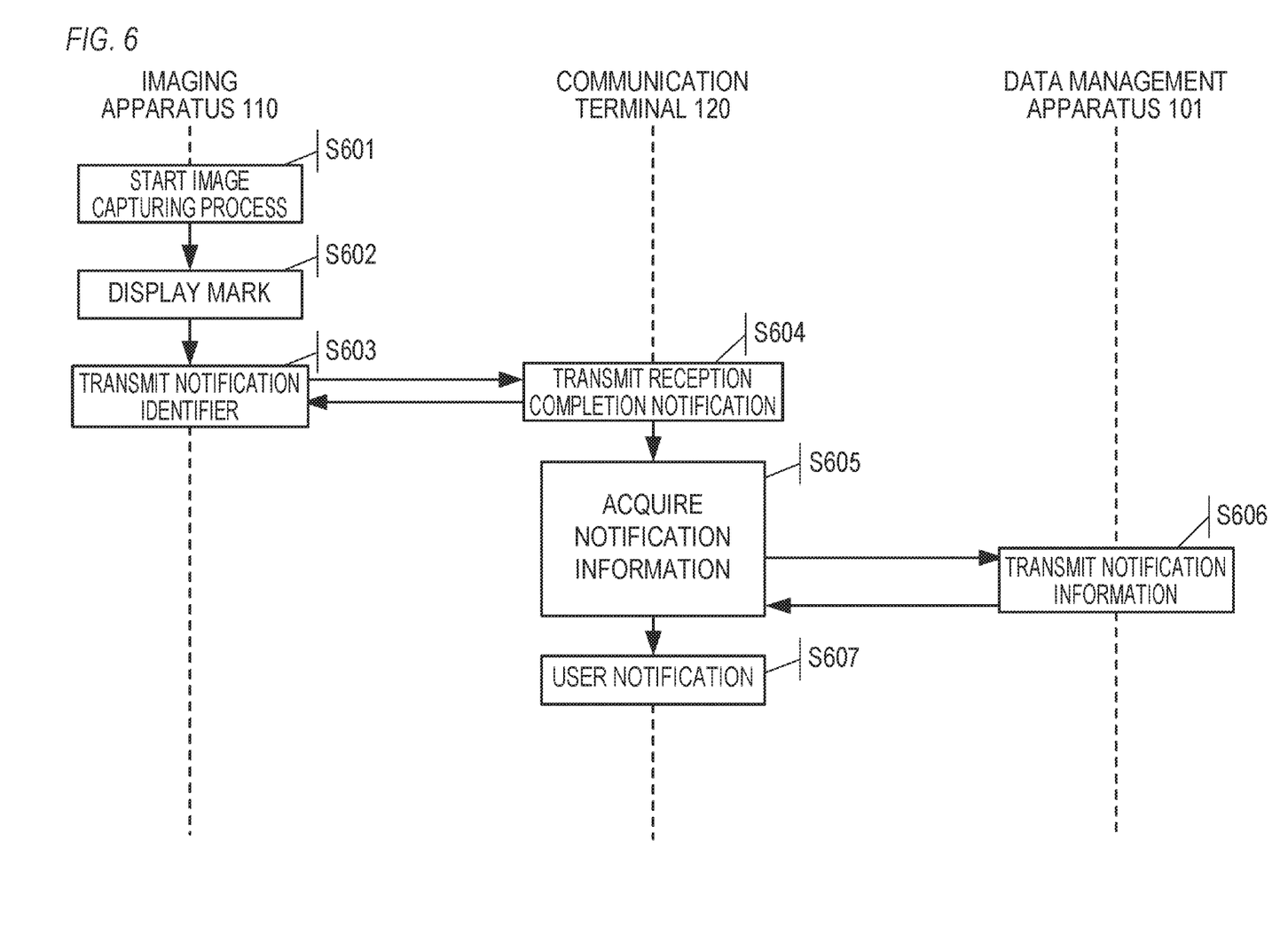
FIG. 6 is a sequence diagram illustrating an example of an operation of the system according to the present embodiment.

FIG. 6 illustrates an example of an operation (a system operation) for the communication terminal 120 to perform notification of information in cooperation with the imaging apparatus 110 and the data management apparatus 101.

In S601, the imaging apparatus 110 (the system control unit 308) starts an image capturing process according to a user's operation on the mode changeover switch 314.

In S602, the imaging apparatus 110 (the system control unit 308) detects a state which is regarded as a notification target among a plurality of states that the imaging apparatus 110 can take. That is, the system control unit 308 determines whether the state of the imaging apparatus 110 is a notification target state. Upon detecting a notification target state, the system control unit 308 performs control so that the notification mark 403 corresponding to the state is displayed on the display unit 310.

In S603, upon detecting the notification target state, the imaging apparatus 110 (the system control unit 308) performs control so that the notification identifier 501 (the identification information) corresponding to the state is transmitted to the communication terminal 120. In this way, the imaging apparatus 110 (the network I/F 326) transmits the notification identifier 501 to the communication terminal 120 (the network I/F 211). Here, transmission of the notification identifier is also referred to as "a request (notification request) for notifying the user of the notification information".

In S604, the communication terminal 120 (the network I/F 211) receives the notification identifier 501 transmitted by the imaging apparatus 110 (the network I/F 326). Moreover, upon receiving the notification identifier 501, the communication terminal 120 (the CPU 206) performs control so that a reception completion notification indicating reception of the notification request is transmitted to the imaging apparatus 110. In this way, the communication terminal 120 (the network I/F 211) transmits the reception completion notification to the imaging apparatus 110 (the network I/F 326).

In S605, the communication terminal 120 (the CPU 206) performs a process of acquiring the notification information corresponding to the notification identifier 501 received in S604. For example, the CPU 206 performs control so that the notification identifier 501 is transmitted to the data management apparatus 101. In this way, the communication terminal 120 (the network I/F 211) transmits the notification identifier 501 to the data management apparatus 101. Here, transmission of the notification identifier is also referred to as a "request (notification information request) for the notification information".

In S606, the data management apparatus 101 (the control unit 103) retrieves an entry corresponding to the notification identifier 501 received from the communication terminal 120 by the process of S605 from the table data of the information database 102. Moreover, the control unit 103 performs control so that the device model number 502, the instruction data 503, and the description data 504 of the entry hit by the retrieval are transmitted to the communication terminal 120. In this way, the data management apparatus 101 transmits three pieces of information (the device model number 502, the instruction data 503, and the description data 504) to the communication terminal 120. As a result, the communication terminal 120 (the CPU 206) acquires the three pieces of information. Among the three pieces of information, the instruction data 503 and the description data 504 are the notification information corresponding to the notification identifier 501 that the communication terminal 120 has received in S604.

In S607, the communication terminal 120 (the CPU 206) performs control so that the user is notified of the notification information corresponding to the notification identifier 501 received in S604. Specifically, the CPU 206 performs control so that the user is notified of the instruction data 503 corresponding to the notification identifier 501 received in S604. The user is preferably notified of the instruction data 503 via audio notification. For example, the speaker 214 of the communication terminal 120 notifies the user of the instruction data 503 via audio according to an instruction from the CPU 206.

The communication terminal 120 (the CPU 206) performs control so that the description data 504 corresponding to the notification identifier 501 received in S604 is displayed on the display unit 201 after image capturing by the imaging apparatus 110 ends. The imaging apparatus 110 may notify the communication terminal 120 of the end of image capturing and may not. When it is possible to output an instruction to end image capturing using the communication terminal 120, the communication terminal 120 can detect the end of image capturing from the user's operation on the communication terminal 120. The communication terminal 120 (the CPU 206) may detect disconnection between the imaging apparatus 110 and the communication terminal 120 as the end of image capturing.

The display timing of the description data 504 is not particularly limited. For example, the imaging apparatus 110 (the system control unit 308) may detect a withdrawal of an eye from a finder such as an optical finder or an electronic viewfinder and may perform control so that the communication terminal 120 is notified of the withdrawal of the eye. The communication terminal 120 (the CPU 206) may perform control so that the description data 504 is displayed on the display unit 201 upon being notified of the withdrawal of the eye by the imaging apparatus 110.

According to the above-described operation, the user can easily understand a method of removing the display of the notification nark 403 by the automatic notification of the instruction data 503. Moreover, the user can easily understand the reason why the notification mark 403 is displayed, an image capturing method that avoids the notification mark 403, and the like by the automatic notification of the description data 504.

Figure 7:
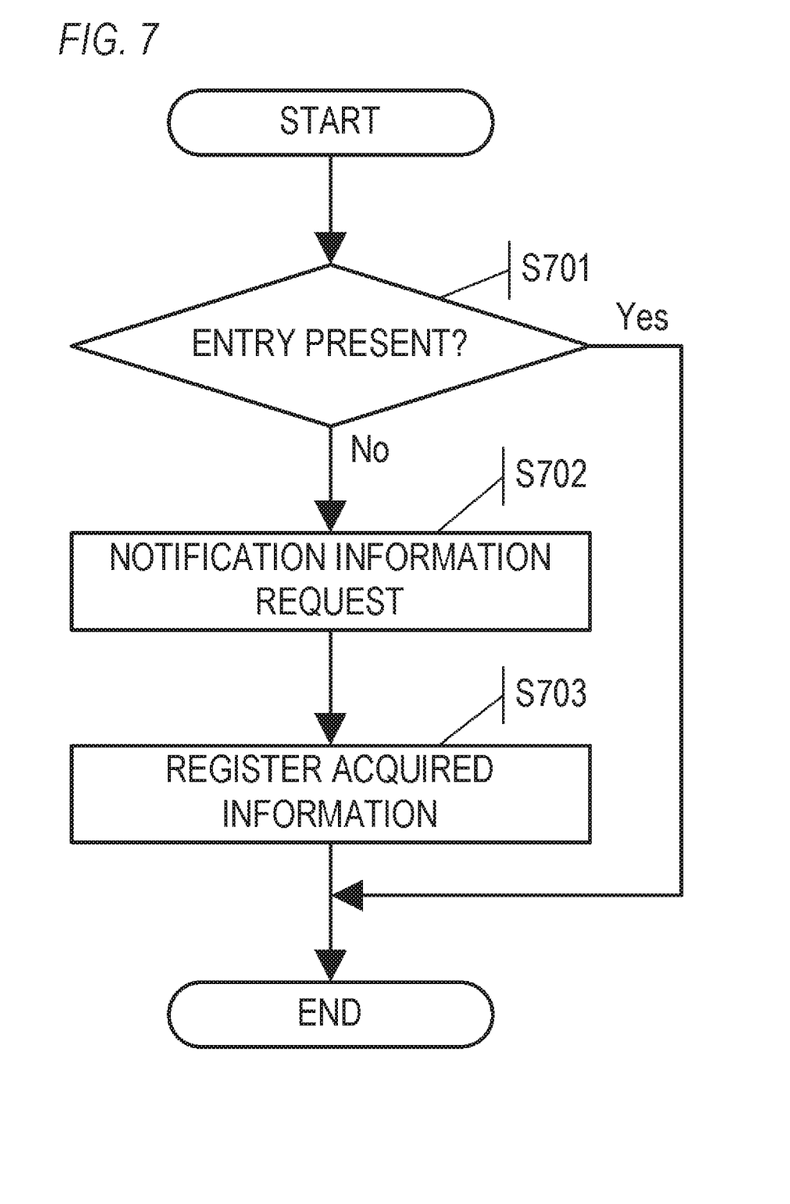
FIG. 7 is a flowchart illustrating an example of an operation of the communication terminal according to the present embodiment.

FIG. 7 is a flowchart illustrating a specific example of the process of S605. The storage unit (the ROM 207, the HDD 209, the memory card 210, and the like) of the communication terminal 120 can store the notification information. For example, the storage unit of the communication terminal 120 can store table data similar to the table data illustrated in FIG. 5.

In S701, the communication terminal 120 (the CPU 206) retrieves the notification information corresponding to the notification identifier 501 received in S604 from the table data of the storage unit. Specifically, the CPU 206 determines whether an entry corresponding to the notification identifier 501 received in S604 is present in the table data of the storage unit.

When it is determined that the entry is present, the communication terminal 120 (the CPU 206) acquires the notification information corresponding to the notification identifier 501 received in S604 from the table data of the storage unit. In this case, the CPU 206 does not perform control for requesting the notification information (control for transmitting the notification identifier 501 to the data management apparatus 101). Therefore, the process of S607 is performed without performing the process of S606.

When it is determined. that the entry is not present, the communication terminal 120 (the CPU 206) performs control for requesting the notification information in S702. As a result, the process of S606 is performed, and the CPU 206 acquires information corresponding to the notification identifier 501 received in S604 from the data management apparatus 101.

In S703, the communication terminal 120 (the CPU 206) adds (registers) the information (the device model number 502, the instruction data 503, and the description data 504) acquired in S702 to the table data of the storage unit in correlation with the notification identifier 501 received in S604.

According to the above-described operation, since the acquired notification information is stored and used, the user can be notified of the notification information earlier. Specifically, when the stored notification information is notified to the user, the notification information can be notified to the user earlier than when the notification information is acquired from the data management apparatus 101 and is notified to the user.

The timing at which the communication terminal 120 (the CPU 206) acquires the notification information from the data management apparatus 101 is not particularly limited. For example, the CPU 206 acquires the notification information corresponding to the notification identifier 501 from the data management apparatus 101 upon receiving the notification identifier 501.

The CPU 206 may detect connection (for example, Wi-Fi connection) between the imaging apparatus 110 and the communication terminal 120. Upon receiving the connection, the CPU 206 may acquire the notification information corresponding to the imaging apparatus 110 from the data management apparatus 101. In this case, for example, the data management apparatus 101 retrieves an entry corresponding to the imaging apparatus 110 from the table data of FIG. 5 using the device model number 502 corresponding to the imaging apparatus 110. The CPU 206 acquires the entry hit by the retrieval from the data management apparatus 101. When the device model number 502 of the imaging apparatus 110 is EOSSD-MK4, the entries 505 to 509 are hit by the retrieval.

The imaging apparatus 110 (the system control unit 308) may detect replacement of a lens (a lens unit) attached to the imaging apparatus 110 and may perform control so that the detected lens replacement is notified to the communication terminal 120. Moreover, upon being notified of the lens replacement by the imaging apparatus 110, the communication terminal 120 (the CPU 206) may acquire the notification information corresponding to a lens after the replacement from the data management apparatus 101. In this case, for example, the data management apparatus 101 retrieves an entry corresponding to the lens after the replacement from the table data of FIG. 5 using the device model number 502 corresponding to the lens after replacement. Moreover, the CPU 206 acquires the entry hit by the retrieval from the data management apparatus 101. The entry 510 is hit by the retrieval when the device model number 502 of the lens after replacement is EF24-70L2, and the entry 511 is hit by the retrieval when the device model number 502 of the lens after replacement is EF70-200LIS2.

Figure 8:
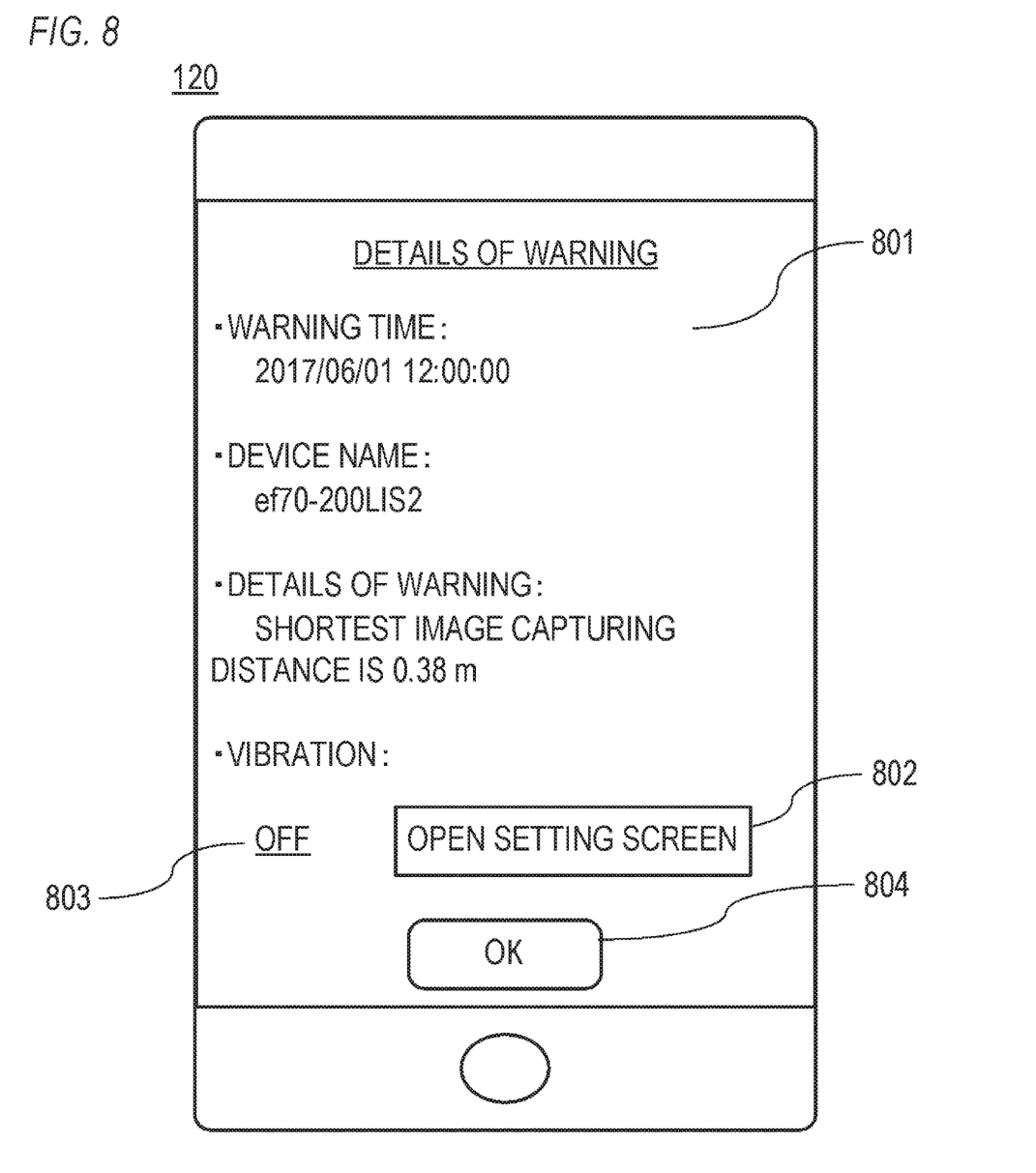
FIG. 8 is a diagram illustrating an example of a notification screen according to the present embodiment.

FIG. 8 illustrates a display example of the description data 504. A notification screen 801 is a screen showing the description data 504. The notification screen 801 shows the device model number 502 and the description data 504 corresponding to the notification identifier 501 that the communication terminal 120 has received in S604 and a time at which the communication terminal 120 has detected the display of the notification mark 403. For example, in S604, the communication terminal 120 (the CPU 206) records the time at which the notification identifier 501 was received in the storage unit as the time at which the display of the notification mark 403 was detected. The time at which the display of the notification mark 403 was detected may be the time at which the notification mark 403 was displayed.

The notification screen 801 further includes a link button 802, vibration setting information 803, and an OK button 804. The link button 802 is a button for displaying a vibration setting screen to be described later. The vibration setting information 803 is a character string indicating a vibration setting state. In FIG. 8, since the vibration is not set, a character string "OFF" is used. The OK button 804 is a button for closing the notification screen 801.

According to the notification screen 801, the user can easily understand the reason why the notification mark 403 is displayed, an image capturing method that avoids the notification mark 403, and the like.

Figure 9:
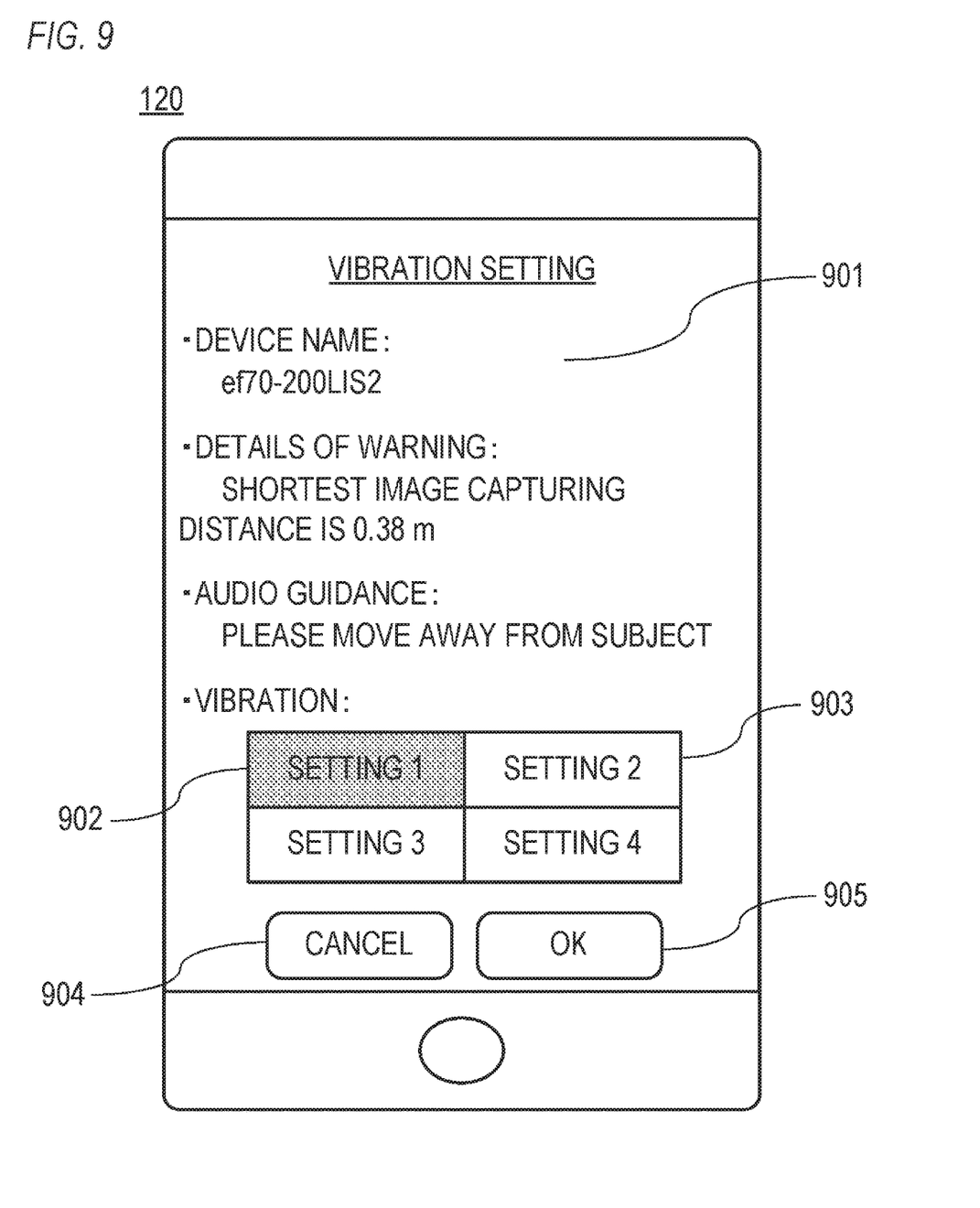
FIG. 9 is a diagram illustrating an example of a vibration setting screen.

FIG. 9 illustrates an example of a vibration setting screen. The communication terminal 120 (the CPU 206) performs control so that a vibration setting screen 901 is displayed according to a user's operation of selecting the link button 802. In description of FIG. 6, it was described that it is preferable to notify the user of the instruction data 503 via an audio. However, notification of the instruction data 503 to the user is not limited to audio notification but a vibration function of the communication terminal 120 may be used for the notification. In order to realize notification using the vibration function, it is necessary to set the correspondence between the notification information and the vibration pattern (vibration method) of the vibrating unit 213 in advance. The vibration setting screen 901 is used for such setting.

The vibration setting screen 901 includes the device model number 502, the instruction data 503, and the description data 504. Furthermore, the vibration setting screen 901 includes a plurality of buttons ("Setting 1" to "Setting 4") for setting a vibration pattern correlated with a combination of the three pieces of information and link buttons 904 and 905.

Symbol 902 indicates that a vibration pattern of "Setting 1" is selected (set) by a user's operation. Symbol 903 indicates that "Setting 2" to "Setting 4" are not selected. The link button 904 is a button for canceling the vibration setting (setting of vibration patterns) performed using the vibration setting screen 901 and returning to the display of the notification screen 801 of FIG. 8. The link button 905 is a button for storing the vibration setting performed using the vibration setting screen 901 and returning to the display of the notification screen 801. When the vibration setting is stored, the vibration setting information (setting number or the like) is correlated with the notification identifier 501. When the vibration setting has been stored, the vibration setting information 803 of the notification screen 801 is updated with the stored vibration setting information.

By performing the vibration setting, the notification information can be notified to the user via vibration.

The instruction data 503 may be notified to the user via any one of audio and vibration, and the instruction data 503 may be notified to the user via both audio and vibration. Moreover, the communication terminal 120 (the CPU 206) may detect audio recording (video capturing or the like) by the imaging apparatus 110. Moreover, the CPU 206 may switch the method of performing notification of the instruction data 503 depending on whether audio recording is detected. When audio notification is performed during audio recording, the notified audio may be recorded as noise. Due to this, the instruction data 503 may be notified to the user via vibration when audio recording is detected, and the instruction data 503 may be notified to the user via audio when audio recording is not detected. Execution (start and end) of audio recording may be notified to the communication terminal 120 by the imaging apparatus 110 and may be not. When it is possible to output an instruction to execute audio recording using the communication terminal 120, the communication terminal 120 can detect execution of audio recording from the user's operation on the communication terminal 120.

As described above, according to the present embodiment, it is possible to allow a user to easily understand the details of a displayed notification mark. As a result, it is possible to eliminate a possibility that the user cannot understand the details (a method for removing the display of the notification mark and the reason why the notification mark is displayed) and fails to image capture a momentary scene that the user wants to capture.

While the present invention has been described on the basis of a preferred embodiment, the present invention is not limited to this specific embodiment and includes various embodiments that do not depart from the spirit of the invention.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Btu-ray Disc (BD)™) a flash memory device, a memory card, and the like.

Therefore, a program code itself supplied to and installed in the computer in order to realize the functional processes of the present invention in the computer also realizes the present invention. That is, a computer program itself for realizing the functional processes of the present invention is also included in the present invention. In this case, the type of a program such as an object code, a program executed by an interpreter, or script data supplied to an OS is not particularly limited as long as it has the function of a program. As a recording medium for supplying a program, a magnetic recording medium such as a hard disk or a magnetic tape, an optical/magneto-optical recording medium, a nonvolatile semiconductor memory, and the like can be used. Moreover, as a method for supplying a program, a method of recording a program that forms the present invention in a server on a computer network and allowing a client computer connected to the computer network to download the program from the server may be considered.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-168432, filed on Sep. 1, 2017, which is hereby incorporated by reference herein in its entirety.

What is claimed is:

1. A system comprising an imaging apparatus and an information processing apparatus,
wherein the imaging apparatus includes:
a first detection unit configured to detect a state which is regarded as a notification target among a plurality of states that the imaging apparatus can take;
a first control unit configured to perform control so that a mark corresponding to the state detected by the first detection unit is displayed on a first display unit; and
a transmission unit configured to transmit identification information corresponding to the state, which is regarded as the notification target, in response to the detection of the state by the first detection unit, and
the information processing apparatus includes:
a reception unit configured to receive the identification information transmitted by the transmission unit; and
a first notification unit configured to performs notification of first notification information on the state corresponding to the identification information received by the reception unit by a method different from displaying.

2. The system according to claim 1, wherein
the first notification unit performs notification of the first notification information via audio.

3. The system according to claim 1, wherein
the information processing apparatus further includes a storage unit configured to store the first notification information.

4. The system according to claim 1, wherein
the information processing apparatus further includes a second control unit configured to perform control so that second notification information on the state corresponding to the identification information is displayed on a second display unit.

5. The system according to claim 4, wherein
the second control unit performs control so that the second notification information is displayed on the second display unit after the imaging apparatus performs image capturing.

6. The system according to claim 4, wherein
the imaging apparatus further includes:
a second detection unit configured to detect a withdrawal of an eye from a finder of the imaging apparatus; and
a second notification unit configured to send a notification to the information processing apparatus in a case where the withdrawal of the eye is detected by the second detection unit, and
the second control unit performs control so that the second notification information is displayed on the second display unit in response to sending the notification by the second notification unit.

7. The system according to claim 4, wherein the first notification information is different from the second notification information.

8. The system according to claim 1, wherein
the information processing apparatus further includes a third detection unit configured to detect audio recording of the imaging apparatus, and
wherein the first notification unit performs notification of the first notification information via audio in a case where the audio recording is not detected by the third detection unit.

9. The system according to claim 1, wherein the information processing apparatus further includes an acquisition unit configured to acquire the first notification information from an external apparatus.

10. The system according to claim 9, wherein
the information processing apparatus further includes a fourth detection unit configured to detect connection between the information processing apparatus and the imaging apparatus, and
the acquisition unit acquires the first notification information corresponding to the imaging apparatus in response to the detection of the connection by the fourth detection unit.

11. The system according to claim 9, wherein
the imaging apparatus further includes:
a fifth detection unit configured to detect replacement of a lens attached to the imaging apparatus; and
a third notification unit configured to notify the information processing apparatus of the replacement of the lens detected by the fifth detection unit, and
the acquisition unit acquires the first notification information corresponding to the lens after replacement in response to the notification of the replacement by the third notification unit.

12. The system according to claim 9, wherein the acquisition unit acquires the first notification information corresponding to the identification information in response to receiving the identification information by the reception unit.

13. The system according to claim 1, wherein
the first display unit is a display unit that is visible over an optical finder or a display unit used as an electronic viewfinder.

14. The system according to claim 1, wherein
the state of the imaging apparatus is regarded as a notification target when an instruction of shooting is not accepted by the imaging apparatus or the imaging apparatus is in a specific setting.

15. An imaging apparatus comprising:
a detection unit configured to detect a state, which is regarded as a notification target, among a plurality of states that the imaging apparatus can take while an imaging process is being performed;
a control unit configured to perform control so that a mark corresponding to the state detected by the detection unit is displayed on a display unit; and
a transmission unit configured to transmit identification information corresponding to the state, which is regarded as the notification target, to an information processing apparatus in response to the detection of the state by the detection unit, wherein
notification of notification information on the state corresponding to the identification information is performed by a method different from displaying.

16. The imaging apparatus according to claim 15, wherein
the state of the imaging apparatus is regarded as a notification target when an instruction of shooting is not accepted by the imaging apparatus or the imaging apparatus is in a specific setting.

17. An information processing apparatus comprising:
a reception unit configured to receive, in response to change of a state of an imaging apparatus into a state, which is regarded as a notification target, while an imaging process is being performed, identification information corresponding to the state; and
a notification unit configured to performs notification of notification information on the state corresponding to the identification information received by the reception unit by a method different from displaying.

18. The information processing apparatus according to claim 17, wherein
the state of the imaging apparatus is regarded as a notification target when an instruction of shooting is not accepted by the imaging apparatus or the imaging apparatus is in a specific setting.

19. A non-transitory computer readable medium that stores a program,
wherein
the program causes a computer to execute a control method for an imaging apparatus,
the method includes:
a detection step of detecting a state, which is regarded as a notification target, among a plurality of states that the imaging apparatus can take while an imaging process is being performed;
a control step of performing control so that a mark corresponding to the state detected in the detection step is displayed on a display unit; and
a transmission step of transmitting identification information corresponding to the state, which is regarded as the notification target, to an information processing apparatus in response to the detection of the state in the detection step, and
notification of notification information on the state corresponding to the identification information is performed by a method different from displaying.

20. A non-transitory computer readable medium that stores a program,
wherein
the program causes a computer to execute a control method for an information processing apparatus,
the method includes:
a reception step of receiving, in response to change of the state of the imaging apparatus into the state, which is regarded as the notification target, while an imaging process is being performed, identification information corresponding to the state; and
a notification step of performing notification of notification information on the state corresponding to the identification information received in the reception step by a method different from displaying.

* * * * *